United States Patent
Zhou et al.

(10) Patent No.: US 12,412,371 B1
(45) Date of Patent: Sep. 9, 2025

(54) AUTOMATED ESTIMATION OF NEEDED RESOURCES RELATED TO LABELING A LABELING SERVICE WITHIN A SERVICE PROVIDER NETWORK

(71) Applicant: Amazon Technologies, Inc., Seattle, WA (US)

(72) Inventors: Xiong Zhou, Bothell, WA (US); Min Bai, Jersey City, NJ (US); Weifeng Chen, Redmond, WA (US); Alex Williams, Johnson City, TN (US); Jonathan Buck, Mounain View, CA (US); Li Erran Li, Palo Alto, CA (US)

(73) Assignee: Amazon Technologies, Inc., Reno, NV (US)

( * ) Notice: Subject to any disclaimer, the term of this patent is extended or adjusted under 35 U.S.C. 154(b) by 357 days.

(21) Appl. No.: 18/128,553

(22) Filed: Mar. 30, 2023

(51) Int. Cl.
  *G06V 10/96* (2022.01)
  *G06V 10/764* (2022.01)

(52) U.S. Cl.
  CPC .......... *G06V 10/764* (2022.01); *G06V 10/96* (2022.01)

(58) Field of Classification Search
  CPC ....... G06V 10/764; G06V 10/96; G06V 10/82
  See application file for complete search history.

(56) References Cited

U.S. PATENT DOCUMENTS

| | | | |
|---|---|---|---|
| 11,308,364 B1 * | 4/2022 | Herman | G06F 18/2178 |
| 11,379,695 B2 * | 7/2022 | Desai | G06V 10/454 |
| 12,148,417 B1 * | 11/2024 | Cardella | G10L 15/18 |

* cited by examiner

*Primary Examiner* — Shaghayegh Azima
(74) *Attorney, Agent, or Firm* — Hogan Lovells US LLP

(57) ABSTRACT

This disclosure describes a system that models the complexity of image labeling tasks utilizing image data, labeling instructions, and label requirements. A labeling service of a service provider network includes an application that determines a task complexity value based on a data complexity value, a cognitive complexity value, and a product complexity value. The task complexity value is used to predict or estimate needed resources for an image labeling task for labeling image data, e.g., the time and effort needed to label (annotate) the image data. Once the needed resources are estimated, associated costs may also be estimated. The needed resources and associated costs may be provided to a user that submitted the image data, who may then provide an indication with respect to proceeding with the image labeling task.

20 Claims, 8 Drawing Sheets

400 ⟶

```
┌─────────────────────────────────────────────────────────────────────────┐
│ RECEIVE, FROM A CLIENT DEVICE ASSOCIATED WITH A USER BY AT LEAST ONE OF │
│ A LABELING SERVICE OR A STORAGE SERVICE OF A SERVICE PROVIDER NETWORK,  │
│           IMAGE DATA COMPRISING A PLURALITY OF IMAGES                   │
│                                   402                                   │
└─────────────────────────────────────────────────────────────────────────┘
                                    ↓
┌─────────────────────────────────────────────────────────────────────────┐
│ BASED AT LEAST IN PART ON THE IMAGE DATA AND LABELING INFORMATION,      │
│ DETERMINE, BY THE LABELING SERVICE USING A FIRST MACHINE LEARNING       │
│ MODEL, A DATA COMPLEXITY VALUE AND A COGNITIVE COMPLEXITY VALUE         │
│                                   404                                   │
└─────────────────────────────────────────────────────────────────────────┘
                                    ↓
┌─────────────────────────────────────────────────────────────────────────┐
│ BASED AT LEAST IN PART ON THE LABELING INFORMATION, DETERMINE, BY THE   │
│ LABELING SERVICE USING A SECOND MACHINE LEARNING MODEL, A PRODUCT       │
│ COMPLEXITY VALUE                                                        │
│                                   406                                   │
└─────────────────────────────────────────────────────────────────────────┘
                                    ↓
┌─────────────────────────────────────────────────────────────────────────┐
│ SUM, BY THE LABELING SERVICE, (I) THE DATA COMPLEXITY VALUE, (II) THE   │
│ COGNITIVE COMPLEXITY VALUE, AND (III) THE PRODUCT COMPLEXITY VALUE TO   │
│ PROVIDE A TASK COMPLEXITY VALUE                                         │
│                                   408                                   │
└─────────────────────────────────────────────────────────────────────────┘
                                    ↓
┌─────────────────────────────────────────────────────────────────────────┐
│ BASED AT LEAST IN PART ON THE TASK COMPLEXITY VALUE, DETERMINE, BY THE  │
│ LABELING SERVICE, AN ESTIMATED AMOUNT OF RESOURCES NEEDED TO LABEL THE  │
│ IMAGE DATA                                                              │
│                                   410                                   │
└─────────────────────────────────────────────────────────────────────────┘
                                    ↓
┌─────────────────────────────────────────────────────────────────────────┐
│ BASED AT LEAST IN PART ON THE ESTIMATED AMOUNT OF RESOURCES NEEDED TO   │
│ LABEL THE IMAGE DATA, LABEL, BY THE LABELING SERVICE, THE IMAGE DATA    │
│                                   412                                   │
└─────────────────────────────────────────────────────────────────────────┘
```

FIG. 4

AUTOMATED ESTIMATION OF NEEDED RESOURCES RELATED TO LABELING A LABELING SERVICE WITHIN A SERVICE PROVIDER NETWORK

BACKGROUND

Service providers offer cloud-based services via service provider networks to fulfill user's computing-service needs without the users having to invest in and maintain computing infrastructure required to implement the services. These service providers are generally in the form of on-demand computing platforms that may provide network-based computing resources and functionality to implement various types of cloud-based services, such as, for example, scalable-storage services, computer-processing services, and so forth. In some examples, developers may utilize services offered by the service provider to run the systems and/or applications using virtual services (or "instances") provisioned on various configurations of hardware-based resources of a cloud-based service.

Service provider networks often include a labeling service. With such labeling services, users provide an image dataset, e.g., still images, video images, etc. The labeling service labels the image dataset. The complexity of such a labeling task has a significant impact on the required resources for the labeling task, e.g., computing resources, human resources, associated costs, etc. The complexity of the labeling task also has a significant impact on the quality of the labeling of the image dataset. The types of the image data, e.g., still images, video images, etc., and labeling requirements generally determine how difficult a labeling process will be in order to complete the labeling task. The amount of time and effort needed to complete a labeling task generally are not included in current labeling complexity measurements since the amount of time and effort needed depend on the knowledge and skills of an annotator as well as the resources, e.g., labeling tools, at the annotator's disposal. The time and effort needed to annotate the image data needs to be predicted or estimated using the task complexity.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 is a flow diagram of an example method for automatically estimating needed resources and estimating associated costs associated with labeling (annotating) image datasets with a labeling service within an on-demand computing platform, e.g., the service provider network of FIG. 1.

DETAILED DESCRIPTION

Figure 1:
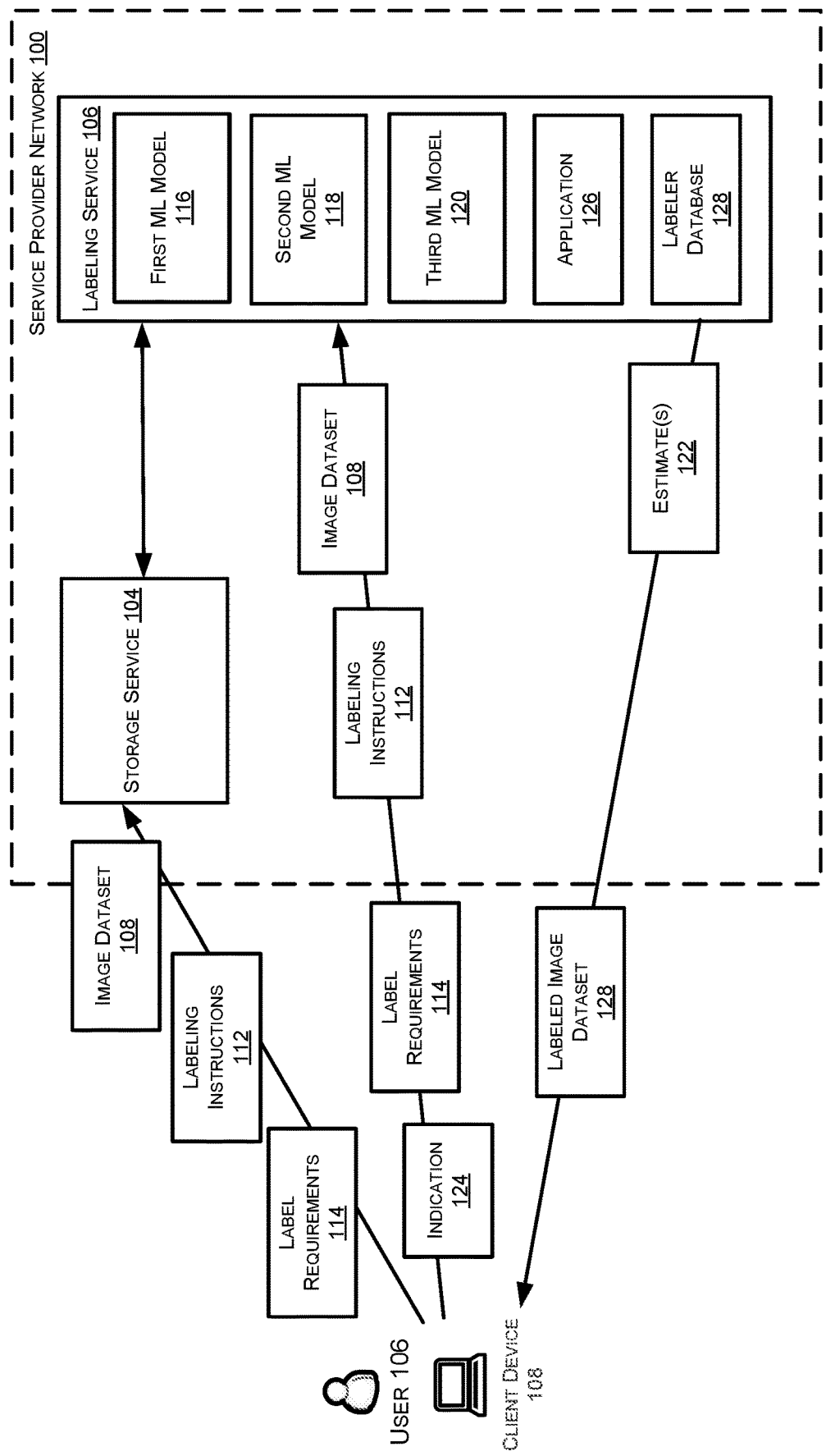
FIG. 1 schematically illustrates a system-architecture diagram of an example service provider network that includes a labeling service that provides an automated process for estimating needed resources and estimating associated costs associated with labeling of image datasets by the labeling service within the service provider network.

This disclosure describes, at least in part, techniques and architecture for a system that models the complexity of image labeling tasks utilizing image data, labeling instructions, and label requirements. In particular, a labeling service of a service provider network includes an application that determines a task complexity value based on a data complexity value, a cognitive complexity value, and a product complexity value. The task complexity value is used to predict or estimate the time and effort needed to label (annotate) the image data.

For example, the application considers the three different factors when estimating the cost of labeling an image dataset. In configurations, the application determines the data complexity, which is based on the nature of the image dataset provided by a user, e.g., the characteristics of the image data. In configurations, a first machine learning model is utilized to determine the data complexity.

The application determines the cognitive complexity. The cognitive complexity relates to how hard will it be for the labeler (annotator) to measure and label this particular image dataset. The application also determines the product complexity factor. The product complexity relates to how soon does the user want the results for the image labeling task. Additionally, the product complexity relates to how accurate the user wishes the final labeled image dataset to be. For example, the user may indicate that a confidence or quality level needs to be 90 percent or above for the labeled image dataset.

Once these three factors have been determined, then the application can use these three factors to estimate needed resources, e.g., an amount of time, an amount of effort, an amount of computing resources, etc., needed to complete the labeling task for the user's image dataset. The three factors are utilized to determine a labeling task complexity, which can be used to estimate the needed resources. Once the labeling task complexity and the estimated needed resources are determined, the application can determine an overall price for the labeling task.

In configurations, the application may provide multiple options for the labeling task to the user. For example, the application may indicate that if a first labeling group and ten hours is selected, the labeling task will cost one hundred dollars. However, the application may also provide an option that indicates that if a second labeling group and fifteen hours is selected, the labeling task will cost eighty dollars.

As previously noted, a first input from the user for the estimation of the needed resources for the labeling task includes the image dataset itself. A second input from the user for the estimation of the needed resources for the labeling task may include the labeling instructions provided by the user. The labeling instructions generally indicate how the user wishes the image dataset to be labeled. A third input from the user for the estimation of the needed resources for the labeling task may include the labeling requirements. For example, the labeling requirements may include a quality requirement, e.g., 90 percent accuracy, and a timing requirement, e.g., the user wishes to have the task completed within a month. In configurations, the image dataset is provided to a first machine learning model in the form of a task-specific model. The task-specific model may be in the form of an object detection model. Object detection models generally utilize a bounding box to locate an object within an image. Another example of the task-specific model includes an image segmentation model that utilizes an exact boundary for locating objects within an image. A third type of task-specific model includes an image classification model. Image classification models generally indicate what an object is, e.g., is the object a dog or a cat. Another type of task-specific model includes an object tracking model. Object tracking models generally can be thought of as a combination of two models: a motion model and an appearance model. The motion model tracks the speed and direction of the object's movement, which allows it to predict a new position of the object based on the received data. At the same time, the appearance model is responsible for determining if the object that has been selected is inside the frame.

In configurations, the labeling instructions and label requirements are provided as inputs to a second machine learning model in the form of a vision-language model. The vision-language model utilizes the labeling instructions and label requirements to provide an output that is used in conjunction with the output of the task-specific model to determine the cognitive complexity. The output of the vision-language model is also used to determine the product complexity. The vision-language model uses, for example, the labeling instructions where the user provides examples for labeling the image dataset. The labeling instructions generally provide how to label an object. For example, if the examples include labeling a cat, the labeling instructions can indicate whether to include a tail of the cat, include the feet of the cat, etc. The examples can generally include a text description and image examples. For the second input to the vision-language model, as previously noted, the label requirements may include a quality requirement, e.g., 90 percent of the cat, and a timing requirement for completion of the labeling task.

When the task-specific model and the vision-language model have determined the data complexity value, the cognitive complexity value, and the product complexity value, the application may sum the three values to determine a task complexity value. Generally, in configurations, the task complexity value is a single number or value where the bigger the number, the more complex the labeling task is. In configurations, the task complexity value may be normalized. For example, the scale for the normalization may be that the task complexity value is between 0 and 1. In other configurations, the task complexity value may be normalized such that the value is in a range of 0 to 100.

When the task complexity value has been determined, the application may utilize a labeler database that includes historical data regarding data related to previous labeling tasks performed by different labeling groups. The application may utilize a third machine learning language model that compares the task complexity value with the historical data. This can generally indicate how long various labeler groups may take to complete the image data labeling task. For example, it may be determined that labeler group A may take ten hours for the image data labeling task, while labeler group B may take eight hours to complete the image data labeling task. Factors that may contribute to an amount of time that a labeler group may take for an image data labeling task, include the tools that various labeler groups have at their disposal. For example, labeler group A may only have basic computer tools and limited software, or even no software at all, e.g., the labeler group will simply use the image data and their computer to manually locate and label (annotate) the objects. In contrast, labeler group B may have better, more advanced tools, e.g., software that labeler group B may use with their computer to locate and label (annotate) objects within the image dataset.

With respect to third machine learning model, generally a generic machine learning model may be trained and used. Generic classes of objects, e.g., trees, animals, buildings, etc., may be used for generic classes for the general machine learning model. The generic classes may be based on the labeling instructions. Users often have an estimate/idea of the size of the objects to be labeled in images, which may be provided in the labeling instructions.

Once the third machine learning model has been used to compare the task complexity with the labeler database, an amount of resources needed, e.g., time, human effort, computing resources, etc., may be determined and thus, an associated cost for the current labeling task may be determined. For example, if labeler group A is used for the current labeling task, then the requirement may be twelve days at a cost of ninety dollars for using labeler group A. However, if labeler group B is utilized, then the required time may be ten days and an associated cost may be one hundred dollars. These options may then be sent to the user who may then select which labeler group to use. Once the choice has been made and an indication has been provided to the labeling service of the service provider network, then the image dataset may be sent to the selected labeler group with labeling instructions.

In configurations, calibrations are constantly made to the task-specific model and the vision-language model. This allows for the continuous improvement of the models. The calibrations generally may be based on actual time, effort, cost, etc., of labeling projects. Thus, when summing the data complexity value, the cognitive complexity value, and the product complexity value together, each value may be multiplied by a calibration factor. For example, the data complexity value may be multiplied by alpha, the cognitive complexity value may be multiplied by beta, and the product complexity may be multiplied by gamma. Generally, the calibration factors are not equal. Once each value has been multiplied by its corresponding calibration factor, then the resulting values may be summed to determine the task complexity.

As an example, in configurations, a method may include receiving, from a client device associated with a user by at least one of a labeling service or a storage service of a service provider network, image data comprising a plurality of images and based at least in part on the image data and labeling information, determining, by the labeling service using a first machine learning model, a data complexity value and a cognitive complexity value. The method may further include based at least in part on the labeling information, determining, by the labeling service using a second machine learning model, a product complexity value. The method may also include summing, by the labeling service, (i) the data complexity value, (ii) the cognitive complexity value, and (iii) the product complexity value to provide a task complexity value and based at least in part on the task complexity value, determining, by the labeling service, an estimated amount of resources needed to label the image data. The method may further include based at least in part on the estimated amount of resources needed to label the image data, labeling, by the labeling service, the image data.

In configurations, the labeling information comprises labeling instructions that comprise examples of object labels for the image data. In some configurations, the labeling information also comprises label requirements that comprise a quality requirement for labeling the image data and a timing requirement for the user to receive labeled image data. In configurations, the quality requirement comprises a level of accuracy for labeling the image data. In configurations, the timing requirement comprises an amount of time until the user desires to have the image data labeled.

In configurations, the first machine learning model comprises one of an object detection model, an image segmentation model, an image classification model, or an object tracking model. In some configurations, the second machine learning model comprises a vision-language model.

In configurations, the method may include prior to summing, by the labeling service, (i) the data complexity value, (ii) the cognitive complexity value, and (iii) the product complexity value, multiplying, by the labeling service, (i) the data complexity value with a first calibration factor, (ii) the cognitive complexity value with a second calibration factor, and (iii) the product complexity value with a third calibration factor. In such configurations, the first calibration factor, the second calibration factor, and the third calibration factor are determined using a third machine learning model trained with historical data.

In configurations, the method may further include providing, by the labeling service to the client device, providing multiple options for labeling the image data, wherein each option comprises a particular estimated amount of resources needed to label the image data. In such configurations, the method may further include receiving, from the client device by the labeling service, a selected option for labeling the image data.

In configurations, determining the estimated amount of resources needed to label the image data further comprises comparing, by the labeling service using a third machine learning model, the task complexity value with historical data related to resources used to label image data.

Thus, the techniques and architecture described herein provide for automatic estimation of needed resources and associated costs for labeling (annotating) image datasets. Such estimation may allow for more efficient use of resources within a service provider network. Additionally, by providing options to a user, overall user experience and satisfaction may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example service provider network 100. The service provider network 100 may comprise servers (not illustrated) that do not require end-user knowledge of the physical location and configuration of the system that delivers the services. Common expressions associated with the service provider network may include, for example, "on-demand computing," "software as a service (SaaS)," "cloud services," "data centers," and so forth. Services provided by the service provider network 100 may be distributed across one or more physical or virtual devices.

As may be seen in FIG. 1, the service provider network 100 includes a labeling service 102 that may be used to label (annotate) image datasets. The service provider network 100 also includes a storage service 104. A user 106 may use a client device 108 to access the service provider network 100 in order to obtain services from the service provider network 100.

In configurations, the user 106 may use the client device 108 to send an image dataset 110 to the labeling service 102, which may store the image dataset 110 in the storage service 104. In some configurations, the user 106 may use the client device 108 to send an image dataset 110 to the storage service 104, which may store the image dataset 110. In such configurations, the labeling service 102 may obtain the image dataset 110 from the storage service 104. The image dataset 110 comprises image data related to a plurality of images. The images may be still images, video images, etc. The user 106 may also use the client device 108 to send labeling information in the form of labeling instructions 112 and/or label requirements 114. In some configurations, the user 106 may use the client device 108 to send the labeling information in the form of labeling instructions 112 and/or label requirements 114 to the storage service 104, which may store the labeling information. In such configurations, the labeling service 102 may obtain the labeling information from the storage service 104. In configurations, the image dataset 110, the labeling instructions 112, and/or the label requirements 114 may be stored in the storage service 104.

The labeling service 102 further includes a first machine learning (ML) model 116, a second ML model 118, and a third ML model 120. As will be described further herein, the labeling service 102 may use the first ML model 116, the second ML model 118, and the third ML model 120 to determine one or more estimates 122 of needed resources for labeling the image dataset 110 and providing the one or more estimates 122 to the client device 108 of the user 106. The user 106 may use the client device 108 to provide an indication 124 to the labeling service 102 for proceeding with labeling the image dataset 110. The indication 124 may be in the form of a selection of one of the one or more estimates 122.

As previously noted, the labeling service 102 uses an application 126 to determine and consider three different factors when estimating the cost of labeling the image dataset 110. In configurations, the application determines data complexity, which is based on the nature of the image dataset 110 provided by the user 106, e.g., the characteristics of the image data. In configurations, the first ML model 116 is utilized to determine the data complexity using the image dataset 110 as input.

The application 126 also determines cognitive complexity. The cognitive complexity relates to how hard will it be for a labeler (annotator) to measure and label this particular image dataset 110. The cognitive complexity may be determined, as will be discussed further herein, based on output from the first ML model 116 and output from the second ML model 118. Input to the second ML model 118 may include the labeling instructions 112 and the label requirements 114.

The application 126 also determines product complexity. The product complexity relates to how soon does the user 106 want the results for the image labeling task. Additionally, the product complexity relates to how accurate the user 106 wishes a final labeled image dataset 128 to be. For example, the user 106 may indicate that a confidence or quality level needs to be 90 percent or above for the labeled image dataset 128.

Once these three factors have been determined, then the application 126 can use these three factors to determine one or more estimate(s) 122 of needed resources, e.g., an amount of time, an amount of effort, an amount of computing resources, etc., needed to complete the labeling task for the user's image dataset. As will be discussed further herein, the three factors are utilized to determine a labeling task complexity, which can be used to determine the estimates 122 of the needed resources. Once the labeling task complexity and the estimated needed resources are determined, the application 126 can determine an overall price for the image labeling task.

In configurations, the application 126 may provide multiple options, e.g., multiple estimates 122, for the image labeling task to the user 106. For example, the application 126 may indicate that if a first labeling group and ten hours is selected, the image labeling task will cost one hundred dollars. However, the application 126 may also provide an option that indicates that if a second labeling group and fifteen hours is selected, the image labeling task will cost eighty dollars.

As previously noted, a first input from the user 106 for the estimation of the needed resources for the image labeling task includes the image dataset 110 itself. A second input from the user 106 for the estimation of the needed resources for the image labeling task may include the labeling instructions 112 provided by the user. The labeling instructions 112 generally indicate how the user 106 wishes the image dataset 110 to be labeled. A third input from the user 106 for the estimation of the needed resources for the image labeling task may include the labeling requirements 114. For example, the labeling requirements may include a quality requirement, e.g., 90 percent accuracy, and a timing requirement, e.g., the user wishes to have the task completed within a month. In configurations, the image dataset 110 is provided to the first ML model 116, which may be in the form of a task-specific model. The first ML model 116 may be in the form of an object detection model. Object detection models generally utilize a bounding box to locate an object within an image. Another example of the first ML model 116 includes an image segmentation model that utilizes an exact boundary for locating objects within an image. A third example of the first ML model 116 includes an image classification model. Image classification models generally indicate what an object is, e.g., is the object a dog or a cat. Another type of task-specific model includes an object tracking model. Object tracking models generally can be thought of as a combination of two models: a motion model and an appearance model. The motion model tracks the speed and direction of the object's movement, which allows it to predict a new position of the object based on the received data. At the same time, the appearance model is responsible for determining if the object that has been selected is inside the frame.

In configurations, the labeling instructions 112 and label requirements 114 are provided as inputs to the second ML model 118, which may be in the form of a vision-language model. The second ML model 118 utilizes the labeling instructions 112 and label requirements 114 to provide an output that is used in conjunction with the output of the first ML model 116 to determine the cognitive complexity, as will be described further herein. The output of the second ML model 118 is also used to determine the product complexity. The second ML model 118 uses, for example, the labeling instructions 112, where the user 106 provides examples for labeling the image dataset 110. The labeling instructions 112 generally provide how to label an object. For example, if the examples includes labeling a cat, the labeling instructions 112 can indicate whether to include a tail of the cat, include the feet of the cat, etc. The examples can generally include a text description and image examples. For the second input to the second ML model 118, as previously noted, the label requirements 114 may include a quality requirement, e.g., 90 percent of the cat, and a timing requirement for completion of the image labeling task.

When the first ML model 116 and the second ML model 118 have determined the data complexity value, the cognitive complexity value, and the product complexity value, the application 126 may sum the three values to determine a task complexity value, as will be described further herein. Generally, in configurations, the task complexity value is a single number or value where the bigger the number, the more complex the labeling task is. In configurations, the task complexity value may be normalized. For example, the scale for the normalization may be that the task complexity value is between 0 and 1. In other configurations, the task complexity value may be normalized such that the value is in a range of 0 to 100.

When the task complexity value has been determined, the application 126 may utilize a labeler database 130 that includes historical data regarding data related to previous labeling tasks performed by different labeling groups. The application 126 may utilize the third ML model 120 that compares the task complexity value with the historical data. This can generally indicate how long various labeler groups may take to complete the image data labeling task. For example, it may be determined that labeler group A may take ten hours for the image data labeling task, while labeler group B may take eight hours to complete the image data labeling task. Factors that may contribute to an amount of time that a labeler group may take for an image data labeling task, include the tools that various labeler groups have at their disposal. For example, labeler group A may only have basic computer tools and limited software, or even no software at all, e.g., the labeler group will simply use the image data and their computer to manually locate and label (annotate) the objects. In contrast, labeler group B may have better, more advanced tools, e.g., software that labeler group B may use with their computer to locate and label (annotate) objects within the image dataset.

With respect to third ML model 120, generally a generic machine learning model may be trained and used. Generic classes of objects, e.g., trees, animals, buildings, etc., may be used for generic classes for the general machine learning model. The generic classes may be based on the labeling instructions 112. Users often have an estimate/idea of the size of the objects to be labeled in images, which may be provided in the labeling instructions 112

Once the third ML model 120 has been used to compare the task complexity with the labeler database 130, an amount of resources needed, e.g., time, human effort, computing resources, etc., may be determined and thus, an associated cost for the current labeling task may be determined. For example, if labeler group A is used for the current labeling task, then the requirement may be twelve days at a cost of ninety dollars for using labeler group A. However, if labeler group B is utilized, then the required time may be ten days and an associated cost may be one hundred dollars. These estimates 122 may then be sent to the user 106 who may then select which estimate 122, e.g., which labeler group to use. Once the choice has been made and an indication has been provided to the labeling service 102 of the service provider network 100, then the image dataset 110 may be sent to the selected labeler group with labeling instructions 112 and/or label requirements 114.

In configurations, calibrations are constantly made to the first ML model 16 and the second ML model 118. This allows for the continuous improvement of the ML models 116, 118. The calibrations generally may be based on actual time, effort, cost, etc., of labeling projects. Thus, when summing the data complexity value, the cognitive complexity value, and the product complexity value together, each value may be multiplied by a calibration factor. For example, as will be described further herein, the data complexity value may be multiplied by alpha, the cognitive complexity value may be multiplied by beta, and the product complexity value may be multiplied by gamma. Generally, the calibration factors are not equal. Once each value has been multiplied by its corresponding calibration factor, then the resulting values may be summed to determine the task complexity.

Figure 2:
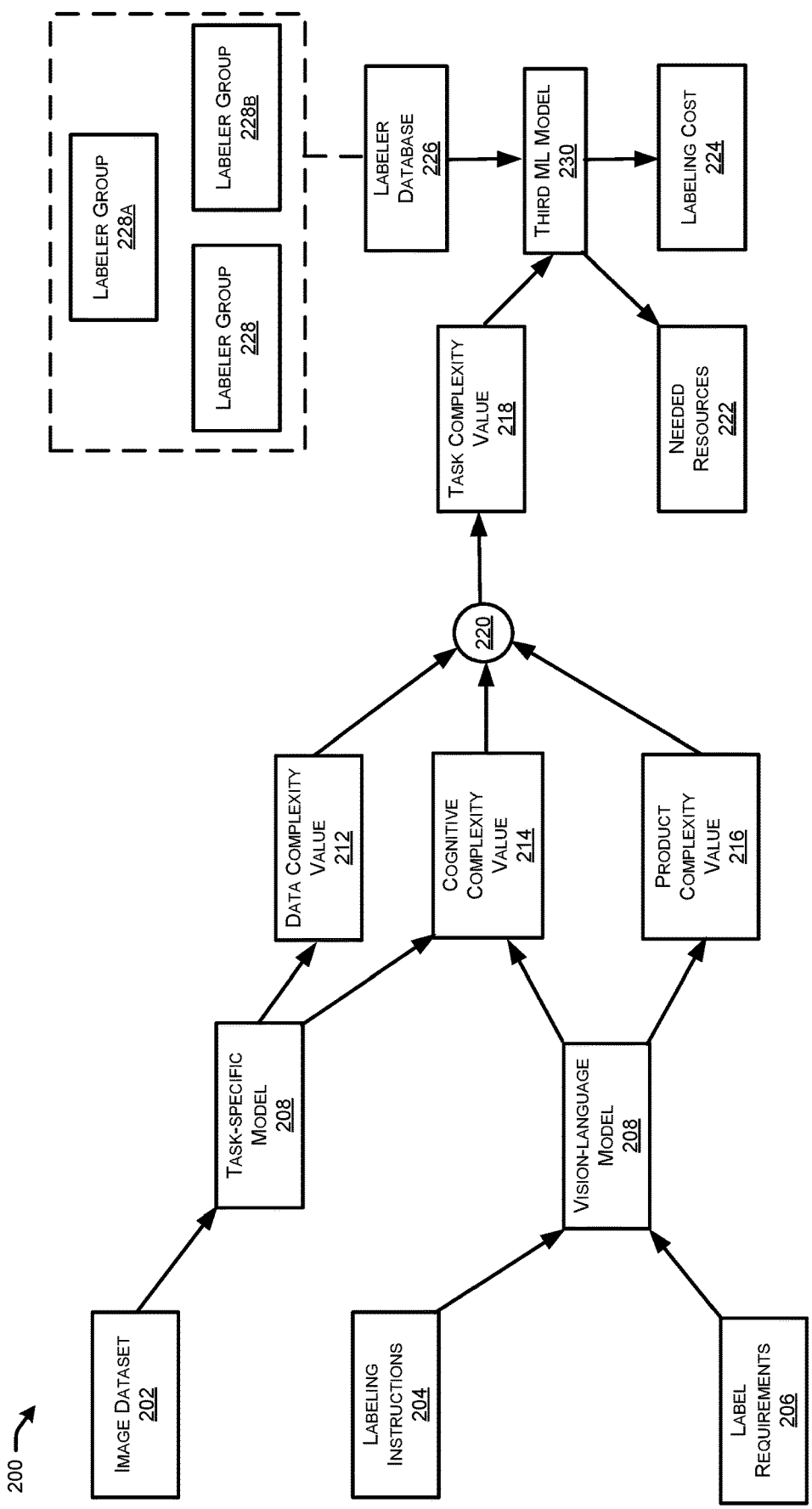
FIG. 2 schematically illustrates an example system for estimating needed resources and estimating associated costs associated with labeling of image datasets by the labeling service of FIG. 1.

FIG. 2 schematically illustrates a system 200 for measuring task complexity with respect to image labeling tasks. The system 200 may be implemented within the labeling service 102 via the application 126. The system 200 includes inputs in the form of image data 202, e.g., image dataset 110, labeling instructions 204, e.g., labeling instructions 112, and label requirements 206, e.g., label requirements 114. The inputs are received from a client device (not shown) associated with a user (not shown), e.g., client device 108 and user 106. The system 200 further includes a first ML model in the form of a task-specific model 208 (e.g., first ML model 116) and a second ML model in the form of a vision-language model 210 (e.g., second ML model 118). The task-specific model 208 may be in the form of an object detection model. Object detection models generally utilize a bounding box to locate an object within an image. Another example of the task-specific model 208 includes an image segmentation model that utilizes an exact boundary for locating objects within an image. A third example of the task-specific model 208 includes an image classification model. Image classification models generally indicate what an object is, e.g., is the object a dog or a cat. Another type of task-specific model includes an object tracking model. Object tracking models generally can be thought of as a combination of two models: a motion model and an appearance model. The motion model tracks the speed and direction of the object's movement, which allows it to predict a new position of the object based on the received data. At the same time, the appearance model is responsible for determining if the object that has been selected is inside the frame.

The system 200 determines and considers three different factors when estimating the cost of labeling the image dataset 110, e.g., data complexity value 212, cognitive complexity value 214, and product complexity value 216. The data complexity value 212, cognitive complexity value 214, and product complexity value 216 are used by the system 200 to determine a task complexity value 218.

In configurations, labeling task complexity value 218 may be defined as a weighted summation of data complexity value 212, cognitive complexity value 214, and product complexity value 216. Equation 1 below provides the relationship as:

Task complexity value218=(alpha*data complexity value212)+(beta*cognitive complexity value214)+(gamma*product complexity value216)     Equation 1

As will be described further herein, the data complexity value 212, cognitive complexity value 214, and product complexity value 216 are determined by the task-specific model 208 and the vision-language model 210. As previously noted, in configurations, calibrations are constantly made to the task-specific model 208 and the vision-language model 210. This allows for the continuous improvement of the ML models 208, 210. The calibrations generally may be based on actual time, effort, cost, etc., of labeling projects. Thus, when summing the data complexity value 212, the cognitive complexity value 214, and the product complexity value 216 together, each value may be multiplied by a corresponding calibration factor, e.g., alpha, beta, and gamma. For example, the data complexity value 212 may be multiplied by alpha, the cognitive complexity value 214 may be multiplied by beta, and the product complexity value 216 may be multiplied by gamma. Generally, the calibration factors are not equal. Once each value has been multiplied by its corresponding calibration factor, then the resulting values may be summed to determine the task complexity value 218.

In configurations, the system 200 determines the data complexity value 212, which is based on the nature of the image dataset 202, e.g., the characteristics of the image data. In configurations, the task-specific model 208 is utilized to determine the data complexity value 212 using the image dataset 202 as input.

More particularly, in configurations, data complexity is a function of the number of distinct acts that need to be executed and the number of distinct information cues that must be processed during the labeling process. The function $TC_1$ is represented below by Equation 2 below as:

$$TC_1 = \Sigma_{j=1,n} \Sigma_{i=0,x} r_{ij}$$     Equation 2

In Equation 2, n represents the number of images in the image dataset 202, represents the number of distinct acts to label one image, which can be computed as the number of objects in the image, and $r_{ij}$ is the number of information cues to be processed, which can be measured as the number of possible classes for the object i in image j. The simplest estimation of $r_{ij}$ would be the number of classes in the labeling task. The similarity between classes should, however, be taken into consideration when determining an object's class. In configurations, WordNet may be used to construct the class hierarchy for a given set of classes. For an object i, the class label is predicted using a pretrained task-specific, object detection model 208 and estimate $r_{ij}$ with Equation 3 below:

$$r_{ij} = D(c_{ij}, H) * |S(cij, H)|$$     Equation 3

In Equation 3, $D(c_{ij}, H)$ and $|S(c_{ij}, H)|$ are the depth and siblings of class c in the class hierarchy H, respectively. Users generally have data and a number of classes for labeling the image data. The labeling instructions 204 include certain classes that the users wish to use as labels. Thus, in configurations, the names of the classes can be used to build a WordNet into a tree that maps these names. The resulting tree can have a very fine grain to a very coarse grain. Generally, classes high in the tree are generally easy to classify. For example, a class high in the tree or hierarchy may be where the object is a cat or a dog. A class lower in the tree or hierarchy generally is harder to classify, for example, a breed of the dog or cat. Using the tree or hierarchy of classes, the $r_{ij}$ for an object can be determined.

The system 200 also determines the cognitive complexity value 214. The cognitive complexity relates to how hard will it be for a labeler (annotator) to measure and label this particular image dataset 202. In particular, the relationship between the labeling task inputs and outputs is measured as cognitive complexity. The form and strength of the relationships between information cues, acts and products are all aspects of cognitive complexity. The cognitive complexity value 214 may be determined based on output from the task-specific model 208 and output from the vision-language model 210. The inputs for the vision-language model 210 may include the labeling instructions 204 and/or the label requirements 206. Equation 4 below represents the cognitive complexity value 214 ($TC_2$) as:

$$TC_2 = \Sigma_{j=1,n} \Sigma_{i=0,p} C^* o_{ij} \qquad \text{Equation 4}$$

In Equation 4, C is the clarity and complexity of labeling instructions and oy is the difficulty of localizing the object i in image j. An ambiguous class definition or a label instruction with a lot of requirements will definitely increase the complexity of a labeling task. On the other hand, a labeling job without any instruction can also be difficult for annotators to work on. The clarity and complexity of labeling instructions can be estimated using a pretrained vision-language model, e.g., vision-language model 210. For example, imagine drawing bounding boxes for bees from a beehive and cars in a parking lot. Even though the number of objects in an image may be similar in both cases, finding the boundary of a bee is much harder than finding the boundary of a car. One way to estimate such difficulty is to measure the crowdedness of objects. With the pretrained vision-language model 210, the box size of each object is known, and the crowdedness can be computed as:

$$o_{ij} = b_{ij}/A_j \qquad \text{Equation 5}$$

In Equation 5, $b_{ij}$ is the box size of object i and A is the size of the smallest box that encloses all objects in image j. As previously noted, for the cognitive complexity, C generally represents the user instructions, which can be very clear so labelers do not need to spend much time to figure out the instructions. In such situations, the value of C may be small. If the labeling instructions are difficult, vague, only a few instructions, etc. then the value of C may be high. $o_{ij}$ generally represents the difficulty of localizing an object i within imagej. For example, $o_{ij}$ may represent the crowdedness, e.g., the image is very crowded with many objects. All objects may not be objects of interest. If an image is very crowded, then $o_{ij}$ is a high value. If not crowded, then the value of $o_{ij}$ is small. For example, if an image is a parking lot and the object to be labeled is a car, if there are only three cars spread out in the parking lot, then the image is not crowded and $o_{ij}$ may have a small value. However, if there are many vehicles in the image, then the value of $o_{ij}$ may be higher.

The system 200 also determines the product complexity value 216. The product complexity value 216 relates to how soon does the user want the results for the image labeling task. Additionally, the product complexity value 216 relates to how accurate the user wishes a final labeled image dataset, e.g., final labeled image dataset 128 to be. For example, the user may indicate that a confidence or quality level needs to be 90 percent or above for the labeled image dataset. More particularly, the product complexity value 216 is a function of behavior requirements defined by product attributes, including label quality and timeline. Labeling the data with 99% accuracy is a very different task than labeling the data with 50% accuracy. Same applies to the time requirement. Thus, the product complexity value 216 ($TC_3$) may be computed as:

$$TC_3 = Q/T \qquad \text{Equation 6}$$

In Equation 6 above, Q is the quality requirement posted by the user and T is the time requirement posted by the user. The time and effort required to complete the task can be retrieved from a labeler database once the task complexity has beencalculated. The labeler database keeps track of past take complexity and time and effort needed in key-value pairs. The labeler database will be updated each time a new task is finished. The time and effort estimation can then be applied to label pricing and project management.

Once the labeling task complexity value 218 has been determined in accordance with Equation 1 above with the data complexity value 212, cognitive complexity value 214, and product complexity value 216 being summed at 220, then the system 200 can use the task complexity value 218 to determine one or more estimate(s) 222 of needed resources, e.g., an amount of time, an amount of effort, an amount of computing resources, etc., needed to complete the labeling task for the user's image dataset 202. Once the labeling task complexity value 218 and the estimate(s) 222 of needed resources are determined, the system 200 can determine a labeling cost 224 for the image labeling task.

In configurations, the system 200 may provide multiple options, e.g., multiple estimates 222, for the image labeling task to the user. For example, the system 200 may indicate that if a first labeling group and ten hours is selected, the image labeling task will cost one hundred dollars. However, the system 200 may also provide an option that indicates that if a second labeling group and fifteen hours is selected, the image labeling task will cost eighty dollars.

More particularly, when the task complexity value 218 has been determined, the system 200 may utilize a labeler database 226, e.g., labeler database 130, that includes historical data regarding data related to previous labeling tasks performed by different labeling groups 228. The system 200 may utilize a third ML model 230 that compares the task complexity value 218 with the historical data in the labeler database 226. This can generally indicate how long various labeler groups 228 may take to complete the image data labeling task. For example, it may be determined that labeler group 228a may take ten hours for the image data labeling task, while labeler group 228b may take eight hours to complete the image data labeling task. Factors that may contribute to an amount of time that a labeler group 228 may take for an image data labeling task, include the tools that various labeler groups 228 have at their disposal. For example, labeler group 228a may only have basic computer tools and limited software, or even no software at all, e.g., the labeler group 228a will simply use the image dataset 202 and their computer to manually locate and label (annotate) the objects. In contrast, labeler group 228b may have better, more advanced tools, e.g., software that labeler group 228b may use with their computer to locate and label (annotate) objects within the image dataset 202.

With respect to third ML model 230, generally a generic machine learning model may be trained and used. Generic classes of objects, e.g., trees, animals, buildings, etc., may be used for generic classes for the general machine learning model. The generic classes may be based on the labeling instructions 204. Users often have an estimate/idea of the size of the objects to be labeled in images, which may be provided in the labeling instructions 204.

Once the third ML model 230 has been used to compare the task complexity with the labeler database 226, an amount of resources needed, e.g., time, human effort, computing resources, etc., may be determined and thus, an associated labeling cost 224 for the current labeling task may be determined. For example, if labeler group 228a is used for the current labeling task, then the requirement may be twelve days at a cost of ninety dollars for using labeler group 228a. However, if labeler group 228b is utilized, then the required time may be ten days and an associated cost may be one hundred dollars. These estimates 222 and labeling costs 224 may then be sent to the user who may then select which estimate 222 and associated labeling costs 224, e.g., which labeler group 228, to use. Once the choice has been made and an indication has been provided to the labeling service, e.g., the labeling service 102 of the service provider network 100, then the image dataset 202 may be sent to the selected labeler group with labeling instructions 204 and/or label requirements 206.

Figure 3:
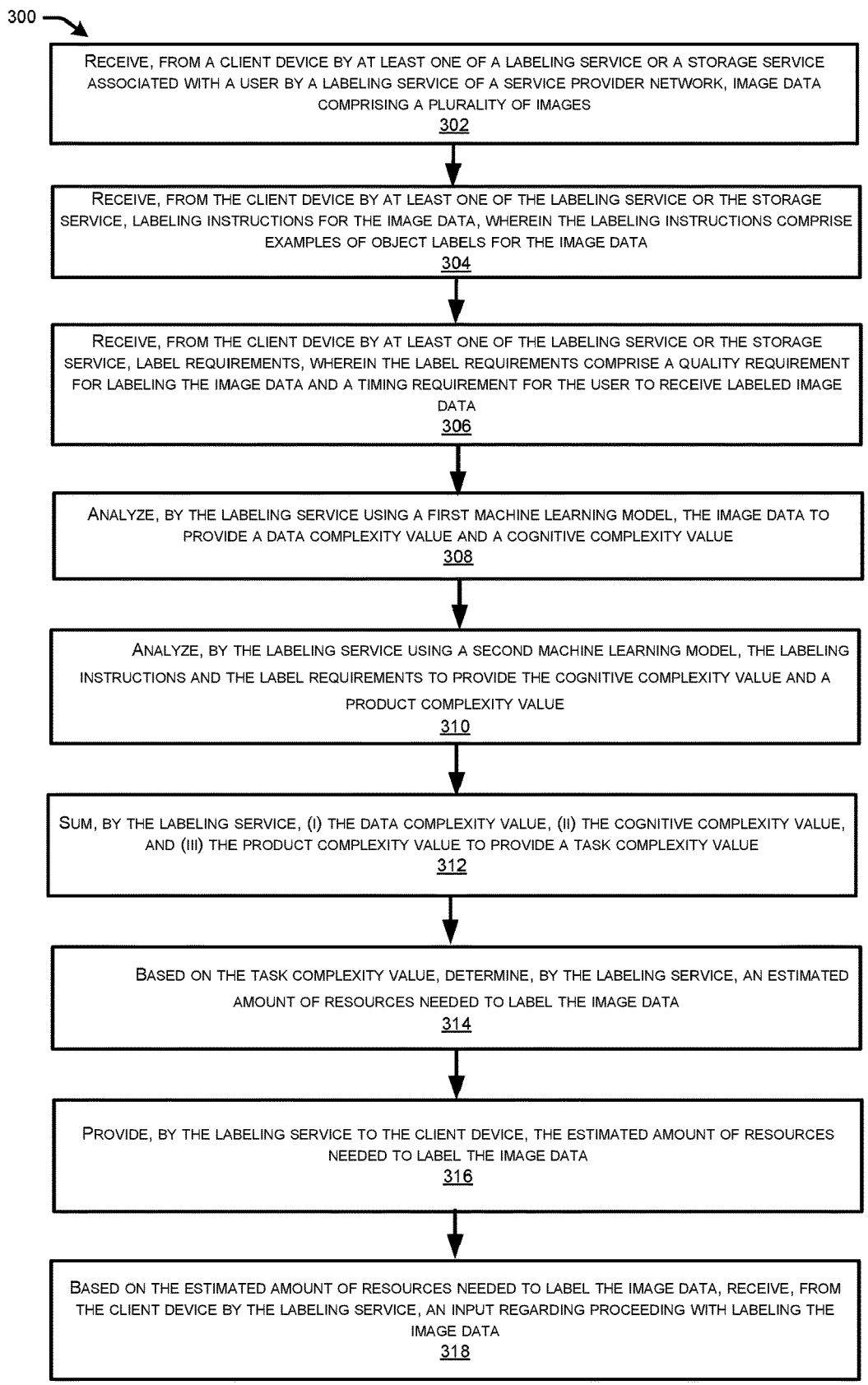
FIG. 3 is a flow diagram of an example method for automatically estimating needed resources and estimating associated costs associated with labeling (annotating) image datasets with a labeling service within an on-demand computing platform, e.g., the service provider network of FIG. 1.

FIGS. 3 and 4 illustrate flow diagrams of example methods 300 and 400 that illustrates aspects of the functions performed at least partly by the services as described in FIGS. 1 and 2. The logical operations described herein with respect to FIGS. 3 and 4 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIGS. 3 and 4 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 3 illustrates a flow diagram of the example method 300 for automatically estimating needed resources and estimating associated costs associated with labeling (annotating) image datasets, e.g., datasets 110, 202, with a labeling service, e.g., labeling service 102, within an on-demand computing platform, e.g., service provider network 100. At 302, image data comprising a plurality of images is received from a client device associated with a user by at least one of a labeling service or a storage service of a service provider network. For example, the user 106 may use the client device 108 to send an image dataset 110 to the labeling service 102 and/or the storage service 104, which may store the image dataset 110 in the storage service 104. The image dataset 110 comprises image data related to a plurality of images. The images may be still images, video images, etc.

At 304, labeling instructions for the image data are received from the client device by at least one of the labeling service or the storage service, wherein the labeling instructions comprise examples of object labels for the image data. For example, the user 106 may also use the client device 108 to send labeling information in the form of labeling instructions 112 and/or label requirements 114.

At 306, label requirements are received from the client device by at least one of the labeling service or the storage service, wherein the label requirements comprise a quality requirement for labeling the image data and a timing requirement for the user to receive labeled image data. For example, the user 106 may also use the client device to send labeling information in the form of labeling instructions 112 and/or label requirements 114.

At 308, the labeling service uses a first machine learning model to analyze the image data to provide a data complexity value and a cognitive complexity value. For example, the labeling service 102 uses an application 126 to determine and consider three different factors when estimating the cost of labeling the image dataset 110. In configurations, the application determines data complexity, which is based on the nature of the image dataset 110 provided by the user 106, e.g., the characteristics of the image data. In configurations, the first ML model 116 is utilized to determine the data complexity using the image dataset 110 as input.

At 310, the labeling service uses a second machine learning model to analyze the labeling instructions and the label requirements to provide the cognitive complexity value and a product complexity value. For example, the application 126 determines cognitive complexity. The cognitive complexity relates to how hard will it be for a labeler (annotator) to measure and label this particular image dataset 110. The cognitive complexity may be determined, based on output from the first ML model 116 and output from the second ML model 118. Input to the second ML model 118 may include the labeling instructions 112 and the label requirements 114. The application 126 also determines product complexity. The product complexity relates to how soon does the user 106 want the results for the image labeling task. Additionally, the product complexity relates to how accurate the user 106 wishes a final labeled image dataset 128 to be. For example, the user 106 may indicate that a confidence or quality level needs to be 90 percent or above for the labeled image dataset 128.

At 312, the labeling service sums (i) the data complexity value, (ii) the cognitive complexity value, and (iii) the product complexity value to provide a task complexity value. For example, when the first ML model 116 and the second ML model 118 have determined the data complexity value, the cognitive complexity value, and the product complexity value, the application 126 may sum the three values to determine a task complexity value, as will be described further herein. Generally, in configurations, the task complexity value is a single number or value where the bigger the number, the more complex the labeling task is. In configurations, the task complexity value may be normalized. For example, the scale for the normalization may be that the task complexity value is between 0 and 1. In other configurations, the task complexity value may be normalized such that the value is in a range of 0 to 100.

At 314, based on the task complexity value, the labeling service determines an estimated amount of resources needed to label the image data. For example, once (i) the data complexity value, (ii) the cognitive complexity value, and (iii) the product complexity value have been determined, then the application 126 can use these three factors to determine one or more estimate(s) 122 of needed resources, e.g., an amount of time, an amount of effort, an amount of computing resources, etc., needed to complete the labeling task for the user's image dataset. As previously noted, the three factors are utilized to determine the labeling task complexity, which can be used to determine the estimates 122 of the needed resources. Once the labeling task complexity and the estimated needed resources are determined, the application 126 can determine an overall price for the image labeling task.

At 316, the labeling service provides, to the client device, the estimated amount of resources needed to label the image data. At 318, based on the estimated amount of resources needed to label the image data, the labeling service receives, from the client device, an input regarding proceeding with labeling the image data. For example, the estimates 122 may be sent to the user 106 who may then select which estimate 122, e.g., which labeler group to use. Once the choice has been made and an indication has been provided to the labeling service 102 of the service provider network 100, then the image dataset 110 may be sent to a selected labeler group with labeling instructions 112 and/or label requirements 114.

FIG. 4 illustrates a flow diagram of another example method 400 for automatically estimating needed resources and estimating associated costs associated with labeling (annotating) image datasets, e.g., datasets 110, 202, with a labeling service, e.g., labeling service 102, within an on-demand computing platform, e.g., service provider network 100. At 402, image data comprising a plurality of images is received from a client device associated with a user by at least one of a labeling service or a storage service of a service provider network. For example, the user 106 may use the client device 108 to send an image dataset 110 to the labeling service 102 and/or the storage service 104, which may store the image dataset 110 in the storage service 104. The image dataset 110 comprises image data related to a plurality of images. The images may be still images, video images, etc.

At 404, based at least in part on the image data and labeling information, the labeling service uses a first machine learning model to determine a data complexity value and a cognitive complexity value. At 406, based at least in part on the labeling information, the labeling service uses a second machine learning model to determine a product complexity value. For example, the application 126 determines cognitive complexity. The cognitive complexity relates to how hard will it be for a labeler (annotator) to measure and label this particular image dataset 110. The cognitive complexity may be determined, based on output from the first ML model 116 and output from the second ML model 118. Input to the second ML model 118 may include the labeling instructions 112 and the label requirements 114. The application 126 also determines product complexity. The product complexity relates to how soon does the user 106 want the results for the image labeling task. Additionally, the product complexity relates to how accurate the user 106 wishes a final labeled image dataset 128 to be. For example, the user 106 may indicate that a confidence or quality level needs to be 90 percent or above for the labeled image dataset 128.

At 408, the labeling service sums (i) the data complexity value, (ii) the cognitive complexity value, and (iii) the product complexity value to provide a task complexity value. For example, when the first ML model 116 and the second ML model 118 have determined the data complexity value, the cognitive complexity value, and the product complexity value, the application 126 may sum the three values to determine a task complexity value, as will be described further herein. Generally, in configurations, the task complexity value is a single number or value where the bigger the number, the more complex the labeling task is. In configurations, the task complexity value may be normalized. For example, the scale for the normalization may be that the task complexity value is between 0 and 1. In other configurations, the task complexity value may be normalized such that the value is in a range of 0 to 100.

At 410, based at least in part on the task complexity value, the labeling service determines an estimated amount of resources needed to label the image data. For example, once (i) the data complexity value, (ii) the cognitive complexity value, and (iii) the product complexity value have been determined, then the application 126 can use these three factors to determine one or more estimate(s) 122 of needed resources, e.g., an amount of time, an amount of effort, an amount of computing resources, etc., needed to complete the labeling task for the user's image dataset. As previously noted, the three factors are utilized to determine the labeling task complexity, which can be used to determine the estimates 122 of the needed resources. Once the labeling task complexity and the estimated needed resources are determined, the application 126 can determine an overall price for the image labeling task.

At 412, based at least in part on the estimated amount of resources needed to label the image data, the labeling service labels the image data. For example, once a choice has been made by the user 106 and an indication has been provided to the labeling service 102 of the service provider network 100, then the image dataset 110 may be sent to a selected labeler group with labeling instructions 112 and/or label requirements 114.

Accordingly, the techniques and architecture described herein provide for automatic estimation of needed resources and associated costs for labeling (annotating) image datasets. Such estimation may allow for more efficient use of resources within a service provider network. Additionally, by providing options to a user, overall user experience and satisfaction may be improved.

Figure 5:
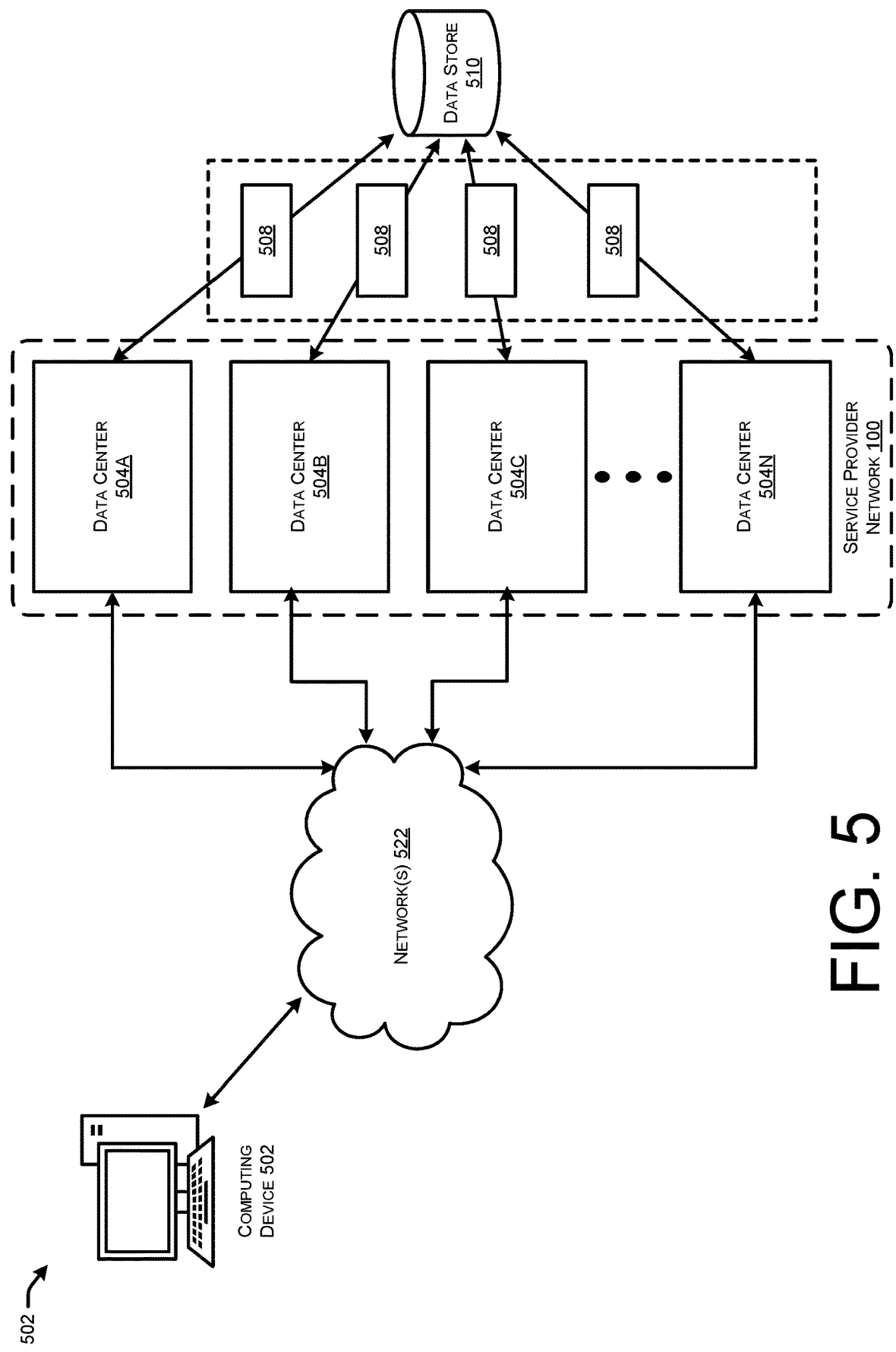
FIG. 5 is a system and network diagram that shows an illustrative operating environment that includes a service provider network that can be configured to implement aspects of the functionality described herein.

FIG. 5 is a system and network diagram that shows one illustrative operating environment 502 for the configurations disclosed herein that includes a service provider network 100 that can be configured to perform the techniques disclosed herein and which may be accessed by a computing device 502. The service provider network 100 can provide computing resources, like VM instances and storage, on a permanent or an as-needed basis. Among other types of functionality, the computing resources provided by the service provider network 100 may be utilized to implement the various services described above such as, for example, the labeling service 102.

Each type of computing resource provided by the service provider network 100 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 100 can also be configured to provide other types of computing resources not mentioned specifically herein.

The computing resources provided by the service provider network 100 may be enabled in one embodiment by one or more data centers 504A-504N (which might be referred to herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 can also be located in geographically disparate locations. One illustrative embodiment for a data center 504 that can be utilized to implement the technologies disclosed herein will be described below with regard to FIG. 5.

The data centers 504 may be configured in different arrangements depending on the service provider network 100. For example, one or more data centers 504 may be included in or otherwise make-up an availability zone. Further, one or more availability zones may make-up or be included in a region. Thus, the service provider network 100 may comprise one or more availability zones, one or more regions, and so forth. The regions may be based on geographic areas, such as being located within a predetermined geographic perimeter.

Users of the service provider network 100 may access the computing resources provided by the service provider network 100 over any wired and/or wireless network(s) 522, which can be a wide area communication network ("WAN"), such as the Internet, an intranet or an Internet service provider ("ISP") network or a combination of such networks. For example, and without limitation, a computing device, e.g., computing device 502, operated by a user of the service provider network 100 may be utilized to access the service provider network 100 by way of the network(s) 522. It should be appreciated that a local-area network ("LAN"), the Internet, or any other networking topology known in the art that connects the data centers 504 to remote customers and other users can be utilized. It should also be appreciated that combinations of such networks can also be utilized.

Each of the data centers 504 may include computing devices that include software, such as applications that receive and transmit data 508. For instance, the computing devices included in the data centers 504 may include software components which transmit, retrieve, receive, or otherwise provide or obtain the data 508 from a data store 510, e.g., data stores 110*a*, 110*b*. For example, the data centers 504 may include or store the data store 510, which may include the data 508.

Figure 6:
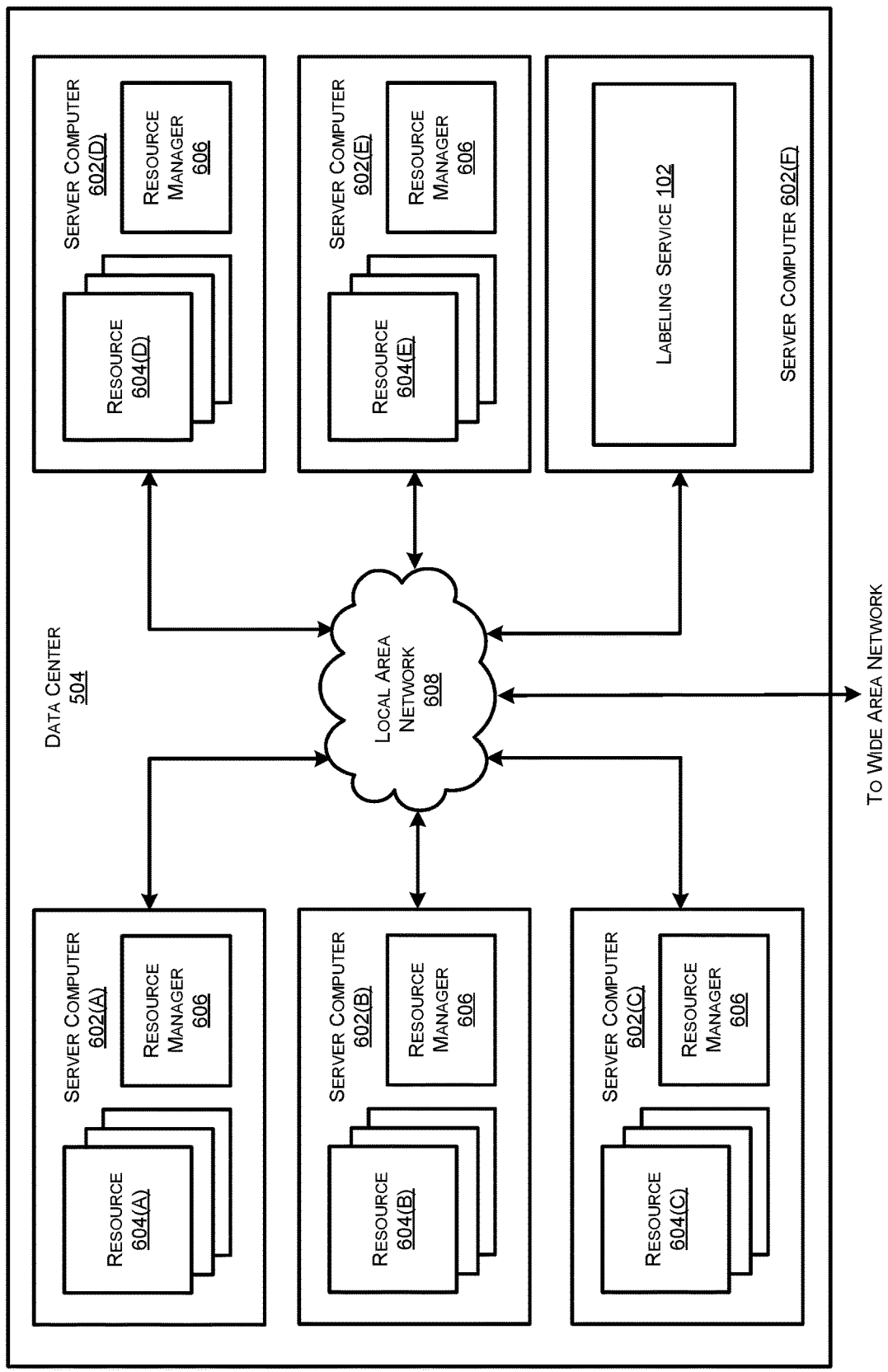
FIG. 6 is a computing system diagram illustrating a configuration for a data center that can be utilized to implement aspects of the technologies disclosed herein.

FIG. 6 is a computing system diagram that illustrates one configuration for a data center 504 that implements aspects of the technologies disclosed herein. The example data center 504 shown in FIG. 6 includes several server computers 602A-602F (which might be referred to herein singularly as "a server computer 602" or in the plural as "the server computers 602") for providing computing resources 604A-604E.

The server computers 602 can be standard tower, rackmount, or blade server computers configured appropriately for providing the computing resources described herein (illustrated in FIG. 6 as the computing resources 604A-604E). As mentioned above, the computing resources provided by the service provider network 100 can be data processing resources such as VM instances or hardware computing systems, database clusters, computing clusters, storage clusters, data storage resources, database resources, networking resources, and others. Some of the servers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single server computer 602. Server computers 602 in the data center 504 can also be configured to provide network services and other types of services, some of which are described in detail below with regard to FIG. 7.

The data center 504 shown in FIG. 6 also includes a server computer 602F that can execute some or all of the software components described above. For example, and without limitation, the server computer 602F can be configured to execute components of the service provider network 100, including the labeling service 102, and/or the other software components described above. The server computer 602F can also be configured to execute other components and/or to store data for providing some or all of the functionality described herein. In this regard, it should be appreciated that the services illustrated in FIG. 6 as executing on the server computer 602F can execute on many other physical or virtual servers in the data centers 504 in various embodiments.

In the example data center 504 shown in FIG. 6, an appropriate LAN 608 is also utilized to interconnect the server computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 504A-504N, between each of the server computers 602A-602F in each data center 504, and, potentially, between computing resources in each of the server computers 602. It should be appreciated that the configuration of the data center 504 described with reference to FIG. 6 is merely illustrative and that other implementations can be utilized.

Figure 7:
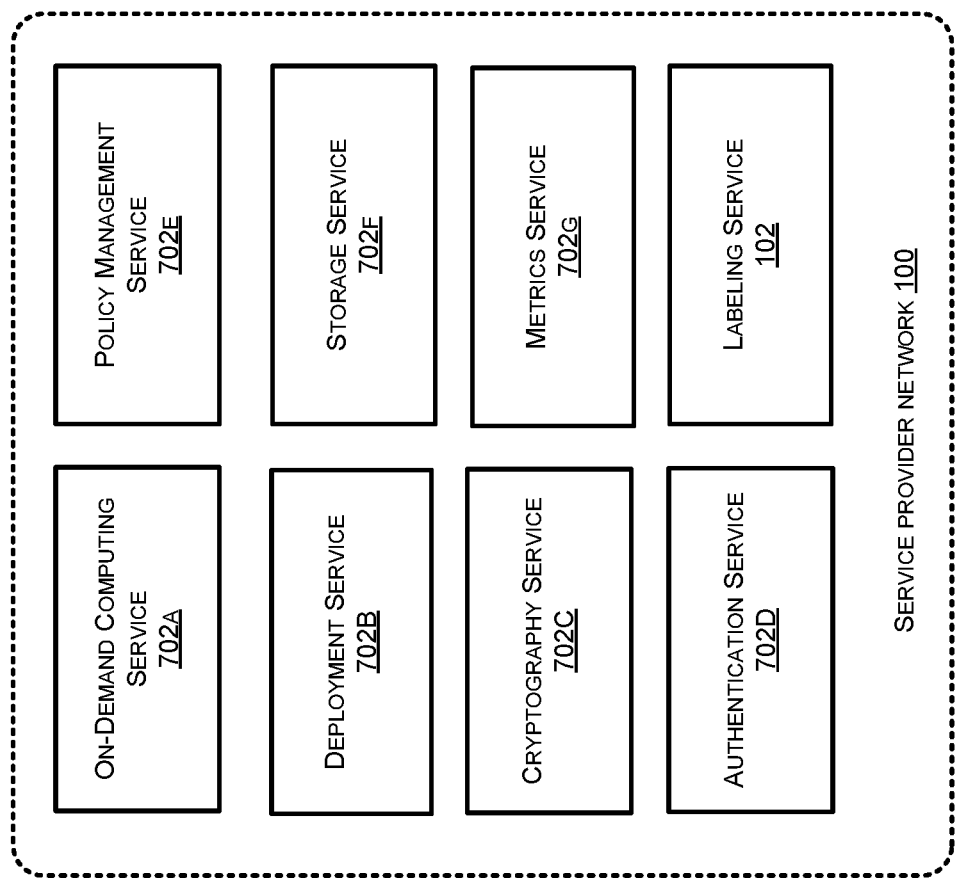
FIG. 7 is a network services diagram that shows aspects of several services that can be provided by and utilized within a system, or a larger system of which the system is a part, which is configured to implement the various technologies disclosed herein.

FIG. 7 is a system and network diagram that shows aspects of several network services that can be provided by and utilized within a service provider network 100 in one embodiment disclosed herein. In particular, and as discussed above, the service provider network 100 can provide a variety of network services to users within the service provider network 100, as well as customers, including, but not limited to, the labeling service 102. The service provider network 100 can also provide other types of services including, but not limited to, an on-demand computing service 702A, a deployment service 702B, a cryptography service 702C, a storage service 702D, an authentication service 702E, and/or a policy management service 702G, some of which are described in greater detail below. Additionally, the service-provider network 100 can also provide other services, some of which are also described in greater detail below.

It should be appreciated that customers of the service provider network 100 can include organizations or individuals that utilize some or all of the services provided by the service provider network 100. As described herein, a customer or other user can communicate with the service provider network 100 through a network, such as the network 622 shown in FIG. 6. Communications from a user computing device, such as the computing device 602 shown in FIG. 6, to the service provider network 100 can cause the services provided by the service provider network 100 to operate in accordance with the described configurations or variations thereof.

It is noted that not all embodiments described include the services described with reference to FIG. 7 and that additional services can be provided in addition to or as an alternative to services explicitly described. Each of the services shown in FIG. 7 can also expose network services interfaces that enable a caller to submit appropriately configured API calls to the various services through web service requests. In addition, each of the services can include service interfaces that enable the services to access each other (e.g., to enable a virtual computer system provided by the on-demand computing service 702A to store data in or retrieve data from a storage service). Additional details regarding some of the services shown in FIG. 7 will now be provided.

As discussed above, the on-demand computing service 702A (can be a collection of computing resources configured to instantiate VM instances and to provide other types of computing resources on demand. For example, a customer or other user of the service provider network 100 can interact with the on-demand computing service 702A (via appropriately configured and authenticated network services API calls) to provision and operate VM instances that are instantiated on physical computing devices hosted and operated by the service provider network 100.

The VM instances can be used for various purposes, such as to operate as servers supporting a web site, to operate business applications or, generally, to serve as computing resources for the customer. Other applications for the VM instances can be to support database applications such as those described herein, electronic commerce applications, business applications and/or other applications. Although the on-demand computing service 702A is shown in FIG. 7, any other computer system or computer system service can be utilized in the service provider network 100, such as a computer system or computer system service that does not employ virtualization and instead provisions computing resources on dedicated or shared computers/servers and/or other physical devices.

The service provider network 100 can also include a cryptography service 702C. The cryptography service 702C can utilize storage services of the service provider network 100 to store encryption keys in encrypted form, whereby the keys are usable to decrypt customer keys accessible only to particular devices of the cryptography service 702C. The cryptography service 702C can also provide other types of functionality not specifically mentioned herein.

As illustrated in FIG. 7, the service provider network 100, in various embodiments, also includes an authentication service 702D and a policy management service 702E. The authentication service 702D, in one example, is a computer system (i.e., collection of computing resources) configured to perform operations involved in authentication of users. For instance, one of the services 702 shown in FIG. 7 can provide information from a user to the authentication service 702D to receive information in return that indicates whether or not the requests submitted by the user are authentic.

The policy management service 702E, in one example, is a network service configured to manage policies on behalf of customers or internal users of the service provider network 100. The policy management service 702E can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 100 can additionally maintain other services 702 based, at least in part, on the needs of its customers. For instance, the service provider network 100 can maintain a deployment service 702B for deploying program code and/or a data warehouse service in some embodiments. Other services can include object-level archival data storage services, database services, and services that manage, monitor, interact with, or support other services. The service provider network 100 can also be configured with other services not specifically mentioned herein in other embodiments.

Figure 8:
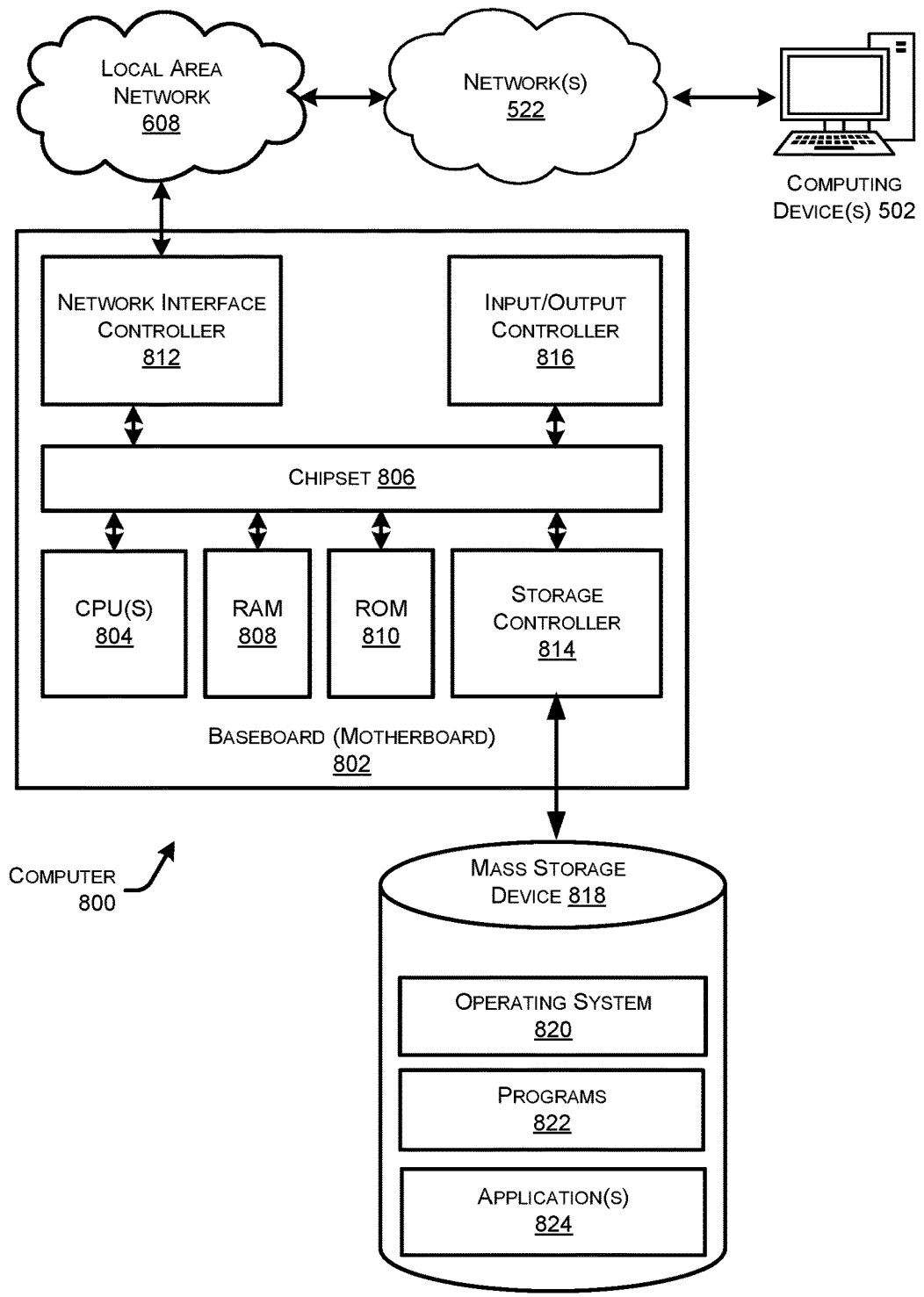
FIG. 8 is a computer architecture diagram showing an illustrative computer hardware architecture for implementing a computing device that can be utilized to implement aspects of the various technologies presented herein.

FIG. 8 shows an example computer architecture for a computer 800 capable of executing program components for implementing the functionality described above. The computer architecture shown in FIG. 8 illustrates a server computer, workstation, desktop computer, laptop, tablet, network appliance, e-reader, smartphone, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices 502 and computer systems through a network, such as the network 608. The chipset 806 can include functionality for providing network connectivity through a Network Interface Controller (NIC) 812, such as a gigabit Ethernet adapter. The NIC 812 is capable of connecting the computer 800 to other computing devices 502 over the network 608 (or 522). It should be appreciated that multiple NICs 812 can be present in the computer 800, connecting the computer to other types of networks and remote computer systems.

The computer 800 can be connected to a mass storage device 818 that provides non-volatile storage for the computer. The mass storage device 818 can store an operating system 820, programs 822 (e.g., agents, etc.), data, and/or applications(s) 824, which have been described in greater detail herein. The mass storage device 818 can be connected to the computer 800 through a storage controller 814 connected to the chipset 806. The mass storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 818 by transforming the physical state of the physical storage units to reflect the information being stored. The specific transformation of physical states can depend on various factors, in different embodiments of this description. Examples of such factors can include, but are not limited to, the technology used to implement the physical storage units, whether the mass storage device 818 is characterized as primary or secondary storage, and the like.

For example, the computer 800 can store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by the service provider network 100, and or any components included therein, may be supported by one or more devices similar to computer 800. Stated otherwise, some or all of the operations performed by the service provider network 100, and or any components included therein, may be performed by one or more computer devices 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The mass storage device 818 can store other system or application programs and data utilized by the computer 800.

In one embodiment, the mass storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-8. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

The computer 800 may transmit, receive, retrieve, or otherwise provide and/or obtain data and/or results to and/or from the service provider network 100. The computer 800 may store the data on the operating system 820, and/or the programs 822 that are stored in the mass storage device 818 to update or otherwise modify the operating system 820 and/or the programs 822.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A computer-implemented method comprising:
receiving, from a client device associated with a user by at least one of a labeling service or a storage service of a service provider network, image data comprising a plurality of images;
receiving, from the client device by at least one of the labeling service or the storage service, labeling instructions for the image data, wherein the labeling instructions comprise examples of object labels for the image data;
receiving, from the client device by at least one of the labeling service or the storage service, label requirements, wherein the label requirements comprise a quality requirement for labeling the image data and a timing requirement for the user to receive labeled image data;
analyzing, by the labeling service using a first machine learning model, the image data to provide a data complexity value and a cognitive complexity value;
analyzing, by the labeling service using a second machine learning model, the labeling instructions and the label requirements to provide the cognitive complexity value and a product complexity value;
summing, by the labeling service, (i) the data complexity value, (ii) the cognitive complexity value, and (iii) the product complexity value to provide a task complexity value;
based on the task complexity value, determining, by the labeling service, an estimated amount of resources needed to label the image data;
providing, by the labeling service to the client device, the estimated amount of resources needed to label the image data; and
based on the estimated amount of resources needed to label the image data, receiving, from the client device by the labeling service, an input regarding proceeding with labeling the image data.

2. The computer-implemented method of claim 1, further comprising:
prior to summing, by the labeling service, (i) the data complexity value, (ii) the cognitive complexity value, and (iii) the product complexity value, multiplying, by the labeling service, (i) the data complexity value with a first calibration factor, (ii) the cognitive complexity value with a second calibration factor, and (iii) the product complexity value with a third calibration factor, wherein the first calibration factor, the second calibration factor, and the third calibration factor are determined using a third machine learning model trained with historical data.

3. The computer-implemented method of claim 1, wherein:
providing, by the labeling service to the client device, the estimated amount of resources needed to label the image data comprises providing multiple options for labeling the image data, wherein each option comprises a particular estimated amount of resources needed to label the image data; and receiving, from the client device by the labeling service, the input regarding proceeding with labeling the image data comprises receiving, by the labeling service from the client device, a selected option for labeling the image data.

4. The computer-implemented method of claim 1, wherein determining the estimated amount of resources needed to label the image data further comprises:
comparing, by the labeling service using a third machine learning model, the task complexity value with historical data related to resources used to label image data.

5. A method comprising:
receiving, from a client device associated with a user by a labeling service of a service provider network, image data comprising a plurality of images;
based at least in part on the image data and labeling information, determining, by the labeling service using a first machine learning model, a data complexity value and a cognitive complexity value;
based at least in part on the labeling information, determining, by the labeling service using a second machine learning model, the cognitive complexity value and a product complexity value;
summing, by the labeling service, (i) the data complexity value, (ii) the cognitive complexity value, and (iii) the product complexity value to provide a task complexity value;
based at least in part on the task complexity value, determining, by the labeling service, an estimated amount of resources needed to label the image data; and
based at least in part on the estimated amount of resources needed to label the image data, labeling, by the labeling service, the image data.

6. The method of claim 5, wherein the labeling information comprises labeling instructions that comprise examples of object labels for the image data.

7. The method of claim 5, wherein the labeling information comprises label requirements that comprise a quality requirement for labeling the image data and a timing requirement for the user to receive labeled image data.

8. The method of claim 7, wherein the quality requirement comprises a level of accuracy for labeling the image data.

9. The method of claim 7, wherein the timing requirement comprises an amount of time until the user desires to have the image data labeled.

10. The method of claim 5, wherein the first machine learning model comprises one of an object detection model, an image segmentation model, an image classification model, or an object tracking model.

11. The method of claim 5, wherein the second machine learning model comprises a vision-language model.

12. The method of claim 5, further comprising:
prior to summing, by the labeling service, (i) the data complexity value, (ii) the cognitive complexity value, and (iii) the product complexity value, multiplying, by the labeling service, (i) the data complexity value with a first calibration factor, (ii) the cognitive complexity value with a second calibration factor, and (iii) the product complexity value with a third calibration factor, wherein the first calibration factor, the second calibration factor, and the third calibration factor are determined using a third machine learning model trained with historical data.

13. The method of claim 5, further comprising:
providing, by the labeling service to the client device, multiple options for labeling the image data, wherein each option comprises a particular estimated amount of resources needed to label the image data; and receiving, from the client device by the labeling service, a selected option for labeling the image data.

14. The method of claim 5, wherein determining the estimated amount of resources needed to label the image data further comprises:

comparing, by the labeling service using a third machine learning model, the task complexity value with historical data related to resources used to label image data.

15. The one or more non-transitory computer-readable media storing computer-executable instructions that, when executed, cause one or more processors to perform operations comprising:

receiving, from a client device associated with a user by a labeling service of a service provider network, image data comprising a plurality of images;

based at least in part on the image data and labeling information, determining, by the labeling service using a first machine learning model, a data complexity value and a cognitive complexity value;

based at least in part on the labeling information, determining, by the labeling service using a second machine learning model, a product complexity value; summing, by the labeling service, (i) the data complexity value, (ii) the cognitive complexity value, and (iii) the product complexity value to provide a task complexity value;

based at least in part on the task complexity value, determining, by the labeling service, an estimated amount of resources needed to label the image data; and based at least in part on the estimated amount of resources needed to label the image data, labeling, by the labeling service, the image data.

16. The one or more non-transitory computer-readable media storing computer-executable instructions of claim 15, wherein the operations further comprise:

prior to summing, by the labeling service, (i) the data complexity value, (ii) the cognitive complexity value, and (iii) the product complexity value, multiplying, by the labeling service, (i) the data complexity value with a first calibration factor, (ii) the cognitive complexity value with a second calibration factor, and (iii) the product complexity value with a third calibration factor, wherein the first calibration factor, the second calibration factor, and the third calibration factor are determined using a third machine learning model trained with historical data.

17. The one or more non-transitory computer-readable media storing computer-executable instructions of claim 15, wherein the operations further comprise:

providing, by the labeling service to the client device, multiple options for labeling the image data, wherein each option comprises a particular estimated amount of resources needed to label the image data; and receiving, from the client device by the labeling service, a selected option for labeling the image data.

18. The one or more non-transitory computer-readable media storing computer-executable instructions of claim 15, wherein determining the estimated amount of resources needed to label the image data further comprises:

comparing, by the labeling service using a third machine learning model, the task complexity value with historical data related to resources used to label image data.

19. The one or more non-transitory computer-readable media storing computer-executable instructions of claim 15, wherein the first machine learning model comprises one of an object detection model, an image segmentation model, an image classification model, or an object tracking model.

20. The one or more non-transitory computer-readable media storing computer-executable instructions of claim 15, wherein the second machine learning model comprises a vision-language model.

\* \* \* \* \*